United States Patent [19]

Meixner

[11] 4,406,168

[45] Sep. 27, 1983

[54] SYSTEM FOR MEASURING TORQUE AND/OR SPEED OF ROTATING SHAFT

[75] Inventor: Edwin J. Meixner, Mt. Prospect, Ill.

[73] Assignee: Borg-Warner Corporation, Chicago, Ill.

[21] Appl. No.: 363,744

[22] Filed: Mar. 30, 1982

[51] Int. Cl.³ .............................................. G01L 3/10
[52] U.S. Cl. ............................ 73/862.36; 73/862.28; 73/DIG. 2
[58] Field of Search ......... 73/862.28, 862.36, DIG. 2, 73/779; 324/209, 164

[56] References Cited

U.S. PATENT DOCUMENTS 4,100,794 7/1978 Meixner ........................ 73/862.36
4,106,334 8/1978 Studtmann ................... 73/862.36
4,306,462 12/1981 Meixner ........................ 73/862.36

Primary Examiner—Charles A. Ruehl
Assistant Examiner—J. Chapman
Attorney, Agent, or Firm—James E. Tracy

[57] ABSTRACT

A magnetic transducer fits over a rotatable shaft and has a multi-pole magnetic core, one primary winding being wound on half of the poles while a second primary winding is wound on the other half. Direct current pulses are alternately supplied to the two primary windings to provide a-c excitation for producing an alternating magnetic flux or field, adjacent to and within the shaft, which changes as the shaft is torsionally stressed when torque is applied thereto. This stressing causes compression and tension in the shaft which alter the shaft permeability and thus vary the magnetic flux pattern in the shaft. The resulting magnetic field is also a function of the shaft speed due to the shaft's armature reaction, eddy currents being generated in the shaft which develop a counter magnetic field that opposes and distorts the field produced by the two primary windings. A secondary circuit in the transducer, comprising a pair of secondary windings each wound on a separate magnetic core, responds to the resulting magnetic field and provides information signals relative to the torque and speed characteristics of the rotating shaft.

5 Claims, 4 Drawing Figures

SYSTEM FOR MEASURING TORQUE AND/OR SPEED OF ROTATING SHAFT

BACKGROUND OF THE INVENTION

This invention relates to a detecting system for sensing changes in permeability of a rotatable shaft to determine its speed and torque.

Systems have been developed having transducers for producing an alternating magnetic field adjacent to and within a rotating shaft and for measuring the changes in that magnetic field to provide information regarding different shaft characteristics, such as speed, torque and horsepower. It has been known that as a driven or loaded shaft is torsionally stressed, compression and tension occur in various portions of the shaft and this changes the shaft permeability and consequently the magnetic flux pattern in the shaft thereby to alter the magnetic field. A torque information signal may be developed from the altered or resulting magnetic field. Such a system is disclosed in U.S. Pat. No. 4,100,794, issued July 18, 1978 in the name of Edwin J. Meixner, and which is assigned to the assignee of the present invention. In addition, it is recognized in U.S. Pat. No. 4,100,794 that the magnetic field also varies as a function of the shaft speed due to the armature reaction in the shaft. Eddy currents will flow on the surface of the rotating shaft and produce a counter magnetic field which opposes and distorts the original magnetic field. The faster the rotational speed, the greater the eddy current flow and the greater the amount of field distortion. As a result, the modified magnetic field may also be used to generate a speed information signal.

The required alternating magnetic field is produced in the transducer in U.S. Pat. No. 4,100,794 by a circular magnetic core, having a series of radially extending poles, on which core is wound a single primary winding comprising series-connected coils, each of the coils being disposed on a respective one of the poles. An a-c voltage source is coupled to the primary winding for translating alternating current to the winding to develop an alternating magnetic flux adjacent to and within the shaft, which shaft extends through the center of the circular magnetic core. Since bidirectional current flow is needed in the primary winding, the driving circuitry to provide the necessary a-c excitation for that winding is relatively costly. In one arrangement, a transformer is employed to provide alternating current in the primary winding. In accordance with another scheme, a-c for the primary winding can be developed by converting d-c to a-c by means of a bridge-type inverter or a similar switching arrangement.

An improved excitation system for the transducer is disclosed in U.S. Pat. No. 4,106,334, issued Aug. 15, 1978 in the name of George H. Studtmann, and assigned to the present assignee. In the Studtmann patent, two multi-coil primary windings are wound in a bifilar arrangement on the magnetic core structure. Each of the radial poles therefore has two coils wound thereon, one coil from each of the two primary windings. The two coils on each pole are physically adjacent to each other, but are electrically isolated or insulated from each other. With this driving scheme, bidirectional current flow is not needed and a simple switching circuit may be utilized to supply, from a direct voltage source, direct current pulses alternately to the two primary windings. In this way, when a d-c pulse is translated to one primary winding the other primary winding will be ineffective and all of the poles will be magnetized with one polarity, whereas when a d-c pulse is then supplied to the other primary winding the first winding will be inoperative and all of the poles will be magnetized with the opposite polarity. As a consequence, the d-c pulses will produce an alternating magnetic flux or field in the central area of the magnetic core through which the rotating shaft extends.

While the approach in U.S. Pat. No. 4,106,334 constitutes an improvement over the arrangement in U.S. Pat. No. 4,100,794, the present invention is a meritorious advance over both of those patents, achieving substantially increased economy and simplification.

SUMMARY OF THE INVENTION

A detecting system, constructed in accordance with the invention, provides an information signal regarding a predetermined characteristic, such as torque or speed, or a rotatable shaft. The system comprises a transducer which encompasses the rotatable shaft and includes a magnetic core having a series of N poles, where N is an even number equal to at least four, every other one of the poles having wound thereon a respective one of N/2 coils which are included in a first primary winding, while each of the intervening N/2 poles has wound thereon a respective one of N/2 coils included in a second primary winding. There are means for alternately supplying direct current pulses to the first and second primary windings to provide a-c excitation for producing an alternating magnetic field, adjacent to and within the shaft, which is a function of and is modified by the predetermined shaft characteristic. The information signal is developed by a secondary circuit which is included in the transducer and has pick-up coils wound on at least one pick-up magnetic core, the coils producing signals in response to the modified magnetic field.

DESCRIPTION OF THE DRAWINGS

The features of the invention which are believed to be novel are set forth with particularity in the appended claims. The invention may best be understood, however, by reference to the following description in conjunction with the accompanying drawings in which like reference numbers identify like elements, and in which:

DESCRIPTION OF THE PREFERRED EMBODIMENT

Figure 1:
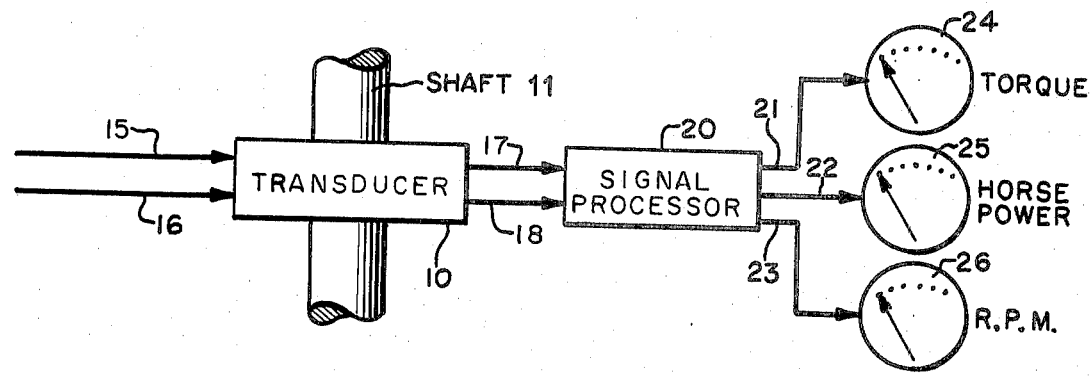
FIG. 1 is a general block diagram of a detecting system, constructed in accordance with the invention, for measuring the torque and speed characteristics of a rotating shaft.

FIG. 1 depicts in a general manner the detecting system of the present invention. As shown in that figure, a magnetic transducer 10 is positioned around a rotatable shaft 11. The means for driving the shaft and the load driven by the shaft are not indicated, as they are not important for understanding the invention. For example, and as taught in U.S. Pat. No. 4,100,794, the transducer may sense the torque and speed of one of the drive components in a motor vehicle. Thus, to sense driveline torque and speed the transducer 10 may be mounted over a portion of the output shaft which extends from the transmission housing and is usually coupled to a universal joint for delivering torque to the drive wheels of the vehicle.

As will become apparent hereinafter, the transducer includes a pair of primary windings, each having a plurality of series-connected coils, wound on a magnetic core for producing alternating magnetic flux within the portion of shaft 11 that extends through and is adjacent to the transducer. To energize the two primary windings, pulsating direct current is alternately supplied to those windings over lines 15 and 16 to provide a-c excitation for creating the required alternating magnetic field.

A secondary circuit comprising a pair of secondary windings, each of which is wound on a respective one of a pair of magnetic cores, develops a pair of output information signals, which relate to speed and torque characteristics of the rotatable shaft, for translation over lines 17 and 18 to a signal processor circuit 20, the construction of which may take the form of the signal processor shown and described in detail in U.S. Pat. No. 4,100,794. Separate output conductors 21, 22 and 23 are provided to pass signals to respective ones of the meters 24, 25 and 26 for respectively indicating the torque, horsepower and speed or RPM characteristics of the rotating shaft 11. Of course, each of the signals representing the torque, horsepower and speed parameters may be applied to any appropriate recording unit or other data-receiving instrument. For example, the speed-indicating signal on line 23 may be used to actuate an odometer or a speedometer. On the other hand, the torque-indicating signal on line 21 may be employed to regulate the change of gear ratio in an automatic transmission. Moreover, there need not be three separate conductors, or conductor pairs, to depict two or three output quantities. A single meter can be used to display different parameters in conjunction with a switch or multiplexer which is actuable to select different quantities from the signal processor circuit at different times for display or recording.

Figure 2:
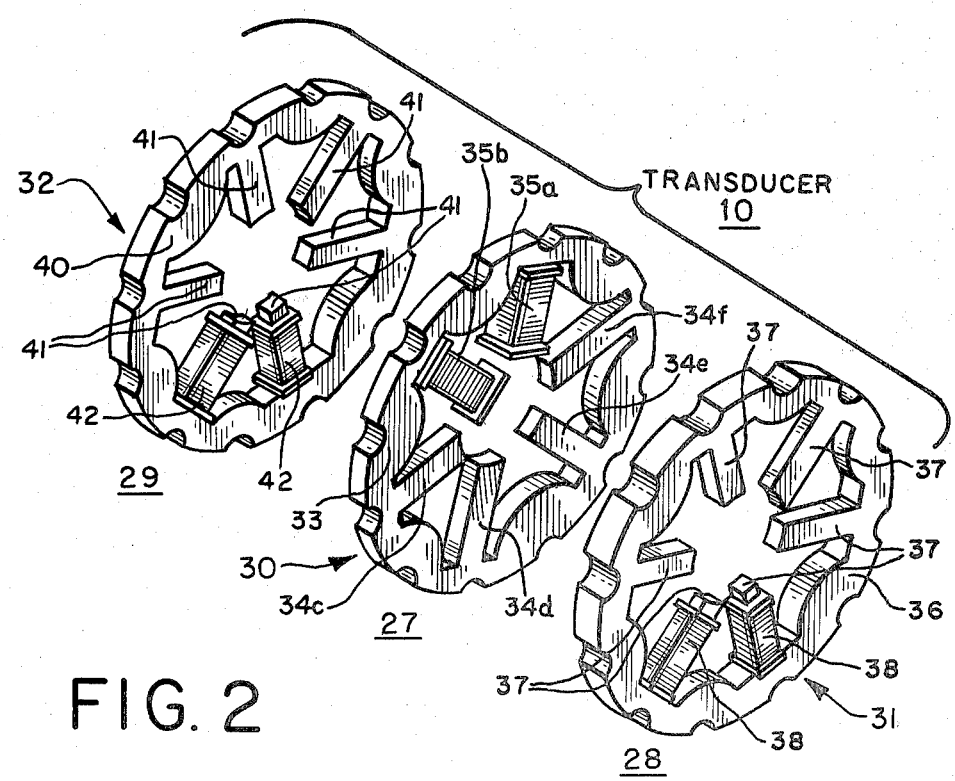
FIG. 2 is an exploded perspective illustration useful in understanding the magnetic core arrangement of the transducer shown in FIG. 1.
Figure 3:
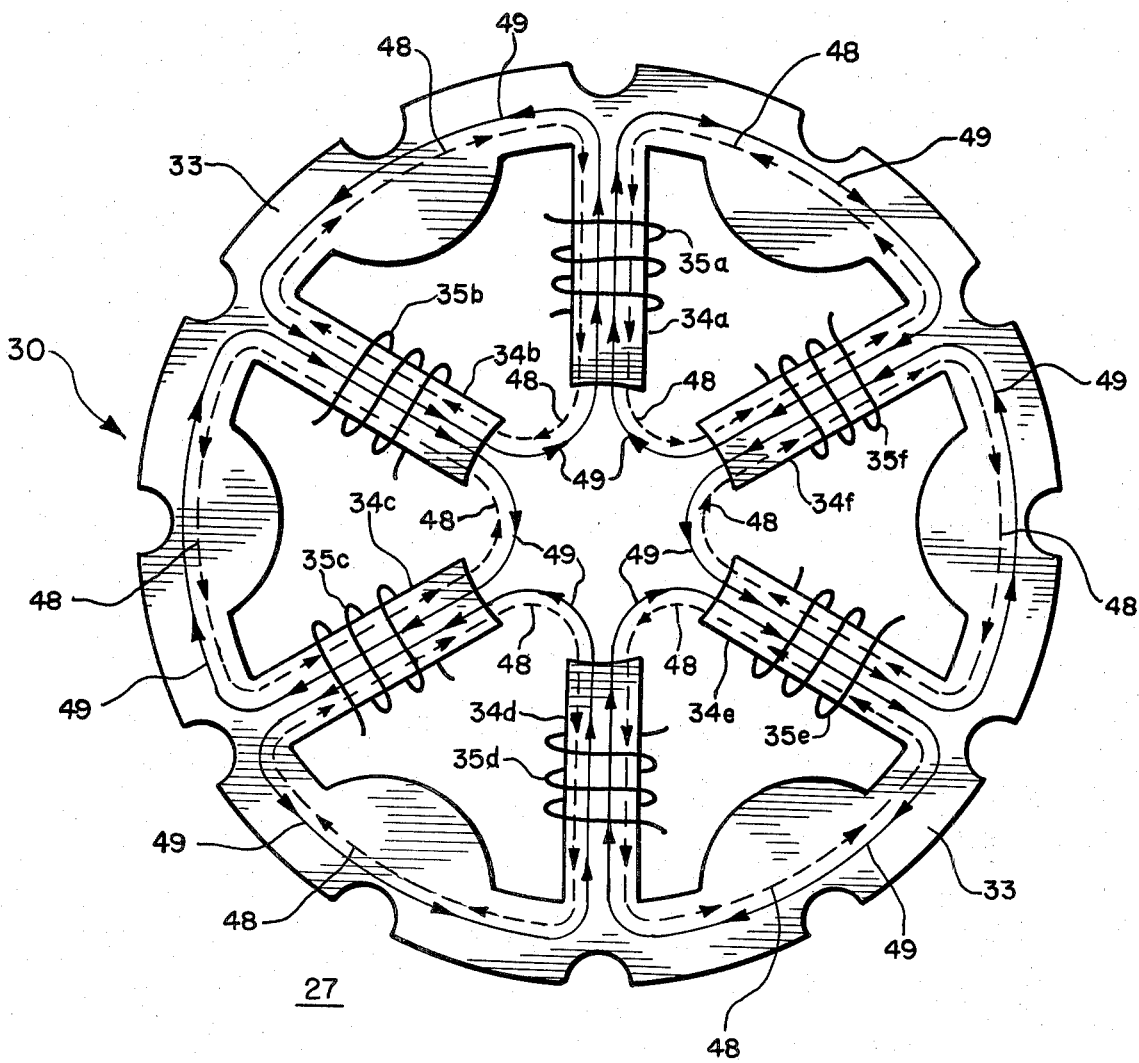
FIG. 3 is a plan view of the primary magnetic core assembly of the transducer and illustrates in detail the winding arrangement of the various coils of the two primary windings on the radially extending poles of the magnetic core.

In the exploded view of FIG. 2, transducer 10 has three different magnetic core assemblies 27, 28 and 29. The first or primary magnetic core assembly 27 includes a magnetic core 30 having a generally circular outer portion 33 and six radial poles 34a-34f extending radially inwardly to a position near the outer surface of the shaft when the transducer encompasses the shaft as shown in FIG. 1. A more detailed illustration of the construction of magnetic core assembly 27 is provided in FIG. 3, and attention is directed to that figure as well as to FIG. 2. Core 30, and each of the magnetic cores of assemblies 28 and 29, may be made of powdered metal. Each of the six poles 34a-34f has wound thereon a respective one of six individual coils 35a-35f. All six coils are schematically illustrated in FIG. 3 but only two are shown in FIG. 2. In accordance with a salient feature of the present invention, the six coils 35a-35f are connected to form two separate primary windings, alternately occurring coils 35a, 35c and 35e being series-connected to provide one primary winding, while the intervening coils 35b, 35d and 35f are series-connected to constitute a second primary winding. In this way, every other one of the six poles 34a-34f has wound thereon a respective one of the three coils of one primary winding, whereas each of the intervening three poles has disposed thereon a respective one of the other three coils forming the other primary winding.

Figure 4:
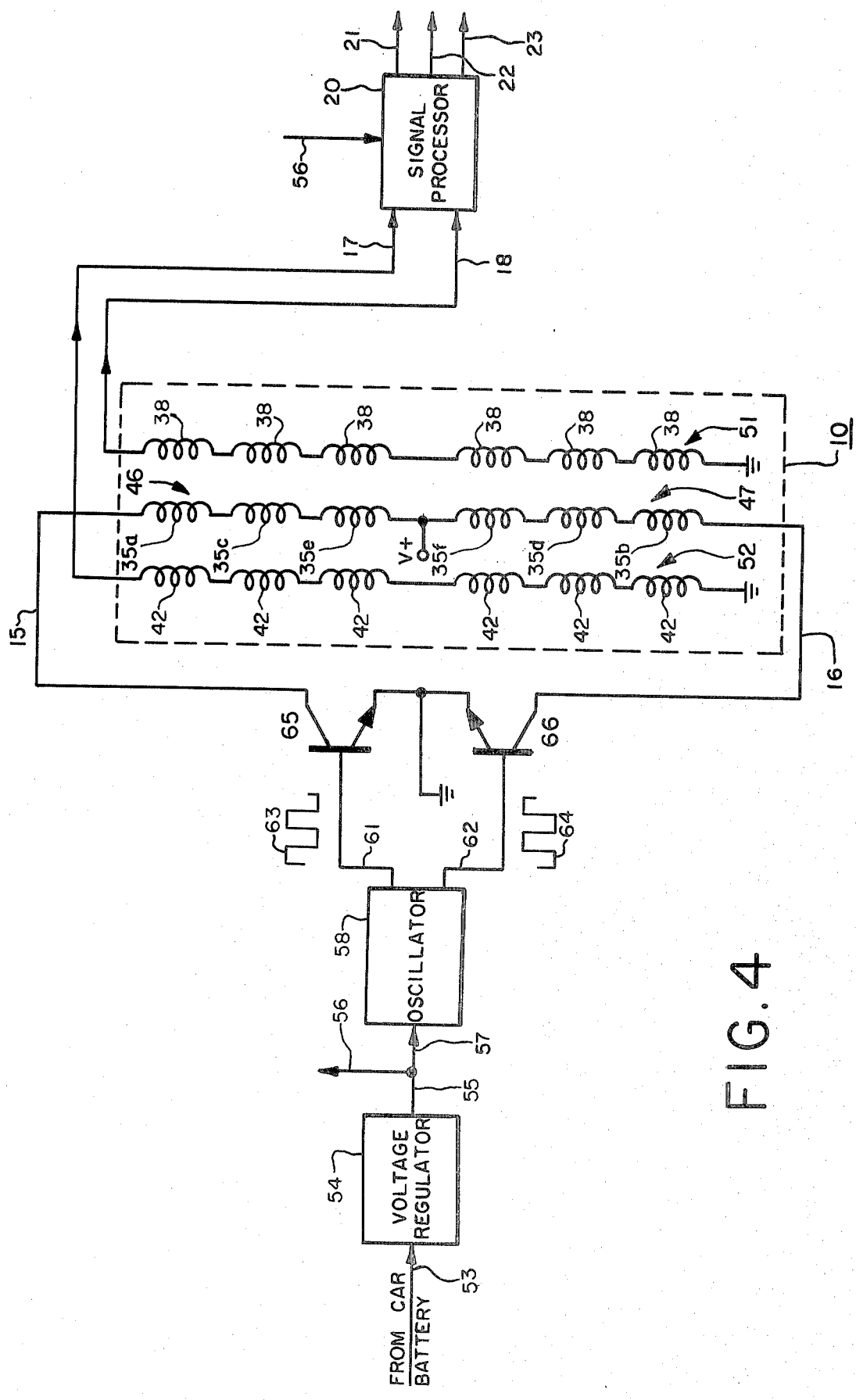
FIG. 4 is a more detailed schematic illustration of the detecting system of FIG. 1.

The electrical connections of the coils 35a-35f are shown in FIG. 4. The primary winding comprising the three series-connected coils 35a, 35c and 35e is designated by the reference number 46, and the primary winding made up of the three series-connected coils 35b, 35d and 35f is identified by the number 47. When there is no direct current in primary winding 47 and direct current is translated through primary winding 46 in the direction from d-c voltage source V+ to conductor 15, a magnetic field is established in core 30 as indicated by the dashed construction lines 48 in FIG. 3 and with the polarity indicated by the arrows on those lines. If the current through winding 46 is then turned off and direct current is made to flow through winding 47 in the direction from d-c voltage source V+ to conductor 16, the flux or magnetic field in core 30 reverses as illustrated by the solid construction lines 49 in FIG. 3. It will therefore be appreciated that by alternately supplying direct current pulses to the primary windings 46 and 47, core 30 may be effectively a-c excited and an alternating magnetic field or flux will be developed within the core's central area and, consequently, within rotatable shaft 11. The manner in which windings 46 and 47 are alternately energized by direct current pulses will be explained hereinafter.

Returning now to the construction of transducer 10, the second and third magnetic core assemblies 28 and 29 are generally physically similar to assembly 27. Electrically the coil connections differ. Hence, the second assembly 28 also includes a magnetic core 31 having a circular outer portion 36 and six equally spaced, radially extending poles 37 each of which supports a coil 38, only two of which are depicted in FIG. 2. The six coils 38, which serve as pick-up coils, are series-connected as shown in FIG. 4 and constitute a first secondary winding 51. The third magnetic core assembly 29 likewise includes a magnetic core 32 having a circular outer portion 40, from which six individual poles 41 extend radially inwardly toward the rotatable shaft. Six coils 42, which also function as pick-up coils, are wound on respective ones of the six poles 41 and are series-connected as shown in FIG. 4 to form a second secondary winding 52. The three magnetic core assemblies 27, 28 and 29 are positioned adjacent to, and are oriented with respect to, each other as shown. Note that the poles 37 and 41 of the second and third cores 31 and 32 are each angularly offset with respect to the positions of the poles 34a-34f of the primary or first magnetic core 30. In other words, in the preferred embodiment each of the poles 37 and 41 is positioned midway between two of the adjacent poles 34a-34f of core 30.

FIG. 4 shows the manner in which pulsating direct current is alternately translated through the two primary windings 46 and 47 to produce the alternating flux in shaft 11. The system illustrated in FIG. 4 is particularly useful in an automotive or other type system where a d-c supply voltage is received over line 53 from a battery and applied, via a voltage regulator 54, to a supply line 55. With proper circuit design in which the transducer is operated near saturation, it has been found that the flux density does not change much with changes in battery voltage; hence a voltage regulator circuit is not mandatory to practice the invention. A single line is sufficient to depict the voltage distribution, as those skilled in the art will understand that a common ground is provided for all of the components. The regulated d-c voltage on line 55 is passed over line 56 to energize the signal processor 20, which comprises a plurality of circuits as illustrated in U.S. Pat. No. 4,100,794. The regulated d-c voltage is also translated over line 57 to oscillator 58 to effect energization thereof. Any suitable circuit can be used for the oscillator, or a plurality of circuits can be combined, to produce, on the output lines 61 and 62, the phase-opposed switching or gating signals represented by the waveforms 63 and 64. The frequency of the switching signals is not critical. It can take any value so long as it will always be very high relative to any torque or speed changes of shaft 11. For example, the frequency may be 60 hertz.

NPN-type transistors 65 and 66 serve as semiconductor switches for energizing the primary windings 46 and 47 in alternation to provide a-c excitation for magnetic core 30. More specifically, a positive-going pulse component of gating signal 63 turns transistor switch 65 on and causes direct current to flow from d-c voltage source V+ (which may be provided by regulator 54) and through winding 46, conductor 15 and the collector-emitter conduction path of transistor 65 to the common ground plane. During that interval, transistor 66 will be turned off. Upon the termination of the positive pulse of waveform 63, a positive pulse of waveform 64 will be applied to the base of transistor 66. Transistor 65 therefore cuts off while transistor 66 is turned on and a direct current pulse is translated through winding 47 in the direction from direct voltage source V+ to conductor 16 and then through the collector-emitter conduction path of transistor 66 to ground. Hence by completing energizing circuits for windings 46 and 47 in alternation, an alternating magnetic field is created adjacent to and within shaft 11, this magnetic field being a function of and being modified by the rotational speed of the shaft and the torque applied to the shaft. In other words, the alternating magnetic flux produced by the excitation of windings 46 and 47 is altered as the shaft speed and/or torsional stresses in the shaft change.

Although not shown in FIG. 4, the collector-emitter paths of transistors 65 and 66 are preferably shunted by oppositely-poled diodes to provide energy recovery and to protect the transistors. The diodes have not been illustrated to avoid unduly encumbering the drawing.

The resulting or modified magnetic field induces signals in the pick-up coils 38 and 42 of the secondary windings 51 and 52 which form the secondary circuit of the transducer. As explained in U.S. Pat. No. 4,100,794, this secondary circuit provides, on lines 17 and 18, two information signals regarding the torque and speed characteristics of shaft 11. Signal processor 20 responds to the two information signals and develops therefrom torque, speed and horsepower signals in the manner described in U.S. Pat. No. 4,100,794. Specifically, the information signal developed by secondary winding 51, and appearing on line 18, is added in signal processor 20 to the information signal produced by secondary winding 52, and applied to line 17, to provide a speed signal. A torque signal is derived in processor 20 by taking the difference of the information signals produced by windings 51 and 52. Alternatively, the signal processor disclosed in U.S. Pat. No. 4,306,462, issued Dec. 22, 1981 in the name of Edwin J. Meixner, and assigned to the present assignee, may be employed.

Of course, while magnetic core 30 is illustrated as having six radial poles 34a–34f, it will readily be appreciated that the core will produce the required magnetic flux with any even number of poles, but at least four. In other words, the core could have four, six, eight, ten, etc., radial poles, half of the poles supporting the coils of one primary winding whereas the coils of the other primary winding are wound on the other half of the poles.

It will now be apparent that the winding arrangement of the present invention is considerably simpler and less expensive than the bifilar winding arrangement in U.S. Pat. No. 4,106,334. More particularly, it is much easier to wind a single coil on a pole than two bifilar coils. Only half as many coil ends or terminals are necessary in the present invention, thereby requiring only half as many solder joints. Moreover, much less copper (assuming that copper wires are used) is needed.

To briefly summarize the detecting system of the present invention, transistor 10 includes a magnetic core 30 having a series of N poles 34a–34f, where N is an even number equal to at least four, every other one of the poles (namely, poles 34a, 34c and 34e) having wound thereon a respective one of N/2 coils (35a, 35c and 35e) which are included in a first primary winding 46, while each of the intervening N/2 poles (34b, 34d and 34f) has wound thereon a respective one of N/2 coils (35b, 35d and 35f) included in a second primary winding 47. Transistors 65 and 66 and their control circuitry provide means for alternately supplying direct current pulses to the first and second primary windings 46, 47 to provide a-c excitation for producing an alternating magnetic field, adjacent to and within rotatable shaft 11, which is a function of and is modified by a predetermined characteristic (torque and/or speed) of the shaft. A secondary circuit 51, 52, which has pick-up coils 38, 42 for producing signals in response to the modified magnetic field, develops an information signal regarding the predetermined shaft characteristic.

While a particular embodiment of the invention has been shown and described, modifications may be made, and it is intended in the appended claims to cover all such modifications as may fall within the true spirit and scope of the invention.

I claim:

1. A detecting system for providing an information signal regarding a predetermined characteristic of a rotatable shaft, comprising:

a transducer encompassing the rotatable shaft and including a magnetic core having a series of N poles, where N is an even number equal to at least four, every other one of the poles having wound thereon only a respective one of N/2 coils which are included in a first primary winding, while each of the intervening N/2 poles has wound thereon only a respective one of N/2 coils included in a second primary winding;

means for alternately supplying direct current pulses to said first and second primary windings to provide a-c excitation for producing an alternating magnetic field, adjacent to and within the shaft, which is a function of and is modified by the predetermined shaft characteristic;

and a secondary circuit, included in said transducer and having pick-up coils wound on at least one magnetic core and which produce signals in response to the modified magnetic field, for developing an information signal regarding the predetermined shaft characteristic.

2. A detecting system according to claim 1 wherein the predetermined shaft characteristic is the torque of the rotatable shaft, the alternating magnetic field being altered as the torsional stresses in the shaft change.

3. A detecting system for providing an information signal regarding at least one characteristic of a rotatable shaft, comprising:
- a transducer encompassing the rotatable shaft and including a first magnetic core having a series of poles, a second magnetic core, a third magnetic core, a first primary winding wound only on predetermined ones of said poles, a second primary winding wound only on certain other ones of said poles, a first secondary winding wound on said second magnetic core, a second secondary winding wound on said third magnetic core, and means for connecting said secondary windings to produce an information signal, regarding the predetermined shaft characteristic, when said primary windings are energized;
- first and second switches, each connected to complete a circuit for direct current flow through one of the primary windings when that switch is actuated;
- and means for regulating the actuation of said switches to provide an a-c energizing flux adjacent to said first magnetic core and within the shaft to develop the information signal in said secondary windings.

4. A detecting system for providing an information signal regarding at least one characteristic of a rotatable shaft, comprising:
- a transducer encompassing the rotatable shaft and including
- a first magnetic core assembly including a first magnetic core having a generally circular outer portion and an even number, but at least four, radial poles, a first primary winding wound only on predetermined alternate ones of said poles, and a second primary winding wound only on the other intervening ones of said poles,
- a second magnetic core assembly having a first secondary winding,
- a third magnetic core assembly having a second secondary winding,
- and means for coupling said first and second secondary windings to provide a secondary circuit;
- first and second switches, connected such that actuation of the first switch completes a circuit for direct current flow through said first primary winding and actuation of the second switch completes a circuit for direct current flow through said second primary winding;
- means for periodically turning said first and second switches on and off in alternation to develop a-c excitation for producing an alternating magnetic field from said first magnetic core assembly and within the rotatable shaft;
- and means, coupled to said secondary circuit, for providing an information signal regarding a predetermined shaft characteristic.

5. A detecting system for providing an information signal regarding at least one characteristic of a rotatable shaft, comprising:
- a transducer encompassing the rotatable shaft and including
- a first magnetic core assembly including a first magnetic core having a generally circular outer portion and six radial poles extending inwardly from the circular outer portion toward the outer surface of the rotatable shaft, leaving room for the shaft to extend through the space defined by the free ends of the poles, a first primary winding consisting of three series-connected coils respectively wound on three predetermined alternate ones of the poles, a second primary winding consisting of three series-connected coils respectively wound on the other three poles which intervene the three predetermined poles,
- a second magnetic core assembly structurally similar to said first magnetic core assembly and including a second magnetic core having a generally circular outer portion and six radial poles extending inwardly from the circular outer portion, and a first secondary winding having six series-connected coils each of which is wound on a respective one of the six poles of the second magnetic core assembly,
- a third magnetic core assembly structurally similar to said first magnetic core assembly and including a third magnetic core having a generally circular outer portion and six radial poles extending inwardly from the circular outer portion, and a second secondary winding having six series-connected coils each of which is wound on a respective one of the six poles of the second magnetic core assembly,
- and means for coupling said first and second secondary windings to provide a secondary circuit,
- the three magnetic core assemblies being oriented such that the poles in the second and third magnetic core assemblies are angularly offset with respect to the adjacent poles in the first magnetic core assembly, each pole in the second and third core assemblies being disposed at an angular position midway between the adjacent poles in the first core assembly;
- first and second semiconductor switches, connected such that actuation of the first switch completes a circuit for direct current flow through said first primary winding and actuation of the second switch completes a circuit for direct current flow through said second primary winding;
- means for supplying gating signals to said first and second switches to develop an a-c excitation for providing an a-c energizing flux from said first magnetic core assembly and adjacent to and within the rotatable shaft;
- and means, coupled to said secondary circuit, for producing an information signal concerning a predetermined shaft characteristic.

* * * * *